United States Patent [19]

Hartmann et al.

[11] Patent Number: 4,823,626
[45] Date of Patent: Apr. 25, 1989

[54] INERTIAL SENSOR ARRANGEMENT

[75] Inventors: Ulrich Hartmann, Uhldingen; Reinhard Fessel, Gaienhofen; Dirk Jansen, Ohlsbach, all of Fed. Rep. of Germany

[73] Assignee: Bodenseewerk Geratetechnik GmbH, Uberlingen/Bodensee, Fed. Rep. of Germany

[21] Appl. No.: 67,095

[22] Filed: Jun. 26, 1987

[30] Foreign Application Priority Data

Jun. 30, 1986 [DE] Fed. Rep. of Germany ....... 3621953

[51] Int. Cl.⁴ .................... G01C 19/28; G01C 19/30
[52] U.S. Cl. .................................. 74/5.34; 74/5.46; 74/5.6 E; 364/453
[58] Field of Search ............. 74/5.34, 5.46, 5.47, 74/5.6 D, 5.6 E; 364/453

[56] References Cited

U.S. PATENT DOCUMENTS

| 4,125,017 | 11/1978 | Dhuyvetter et al. | 74/5.34 X |
| 4,222,270 | 9/1980 | Allen | 318/648 X |
| 4,243,324 | 1/1981 | Friedland | 356/350 |
| 4,255,054 | 3/1981 | Friedland | 356/350 |
| 4,303,978 | 12/1981 | Shaw et al. | 364/454 X |
| 4,321,678 | 3/1982 | Krogmann | 364/434 X |
| 4,592,242 | 6/1986 | Kempas | 74/5 F |
| 4,626,759 | 12/1986 | McBrien | 318/648 X |

FOREIGN PATENT DOCUMENTS

| 3011043 | 10/1980 | Fed. Rep. of Germany . |
| 2948051 | 6/1981 | Fed. Rep. of Germany . |
| 3313434 | 11/1983 | Fed. Rep. of Germany . |
| 3141405 | 9/1985 | Fed. Rep. of Germany . |

Primary Examiner—Rodney H. Bonck
Attorney, Agent, or Firm—Lee & Smith

[57] ABSTRACT

An inertial sensor arrangement comprises two electrically restrained gyros with three mutually orthogonal input axes. After A/D-conversion pick-off signals are supplied to a digital computer which forms part of the restraining loop of the gyros and provides digital output signals. The output signals are applied to a D/A-converter which supplies corresponding currents to the torquer of the gyros. Thereby integrating quantization errors are avoided. The cross-coupling behavior and gyro errors can be compensated in the computer. The inertial sensor arrangement can be measured as an entirety. The gyro parameters measured thereby are memorized in an EEPROM and are taken into account in the computer.

10 Claims, 5 Drawing Sheets

INERTIAL SENSOR ARRANGEMENT

TECHNICAL FIELD

The invention relates to an inertial sensor arrangement, comprising (a) at least one gyro with a spin axis, (b) a pick-off provided on the gyro and responding to a rotational movement about an input axis perpendicular to the spin axis of the gyro and generating a pick-off signal, (c) a torquer arranged on the gyro to exert a torque on the gyro about an axis perpendicular to the spin axis and to the input axis, (d) signal processing means to which the pick-off signal is supplied, said signal processing means being arranged to generate a restraining signal applied to the torquer, and (e) means for generating a digital output signal indicative of the restraining signal.

BACKGROUND ART

For the measurement of the angular rate of airplanes or missiles, electrically restrained gyros are used. The movement of the gyro about an input axis perpendicular to the spin axis of the gyro relative to a housing is picked-off by a pick-off, which provides a pick-off signal. This pick-off signal is applied to restraining electronics, which provide a restraining signal. The restraining signal is applied to a torquer. The torquer exerts a torque on the gyro about an axis perpendicular to the input axis and the spin axis in a way that the gyro is electrically restrained in a position of rest relative to the housing. The torque generated thereby, which in turn is represented by the current supplied to the torquer, ideally is proportional to the angular rate of the gyro and the housing about the input axis. In known electrically restrained gyros the restraining electronics is an analog amplifier network which provides a current directly supplied to the torquer with the desired time response. When the signal processing is digital, this current is converted by an analog to digital converter to a digital output signal.

Inertial sensor arrangements are known in which the angular rates about three mutually orthogonal axes are measured. This can be achieved by means of three electrically restrained gyros of the kind described hereinbefore. But also a gyro can be used which has two input axes which are mutually orthogonal and perpendicular to the spin axis. A pick-off and a torquer is provided on each of the input axes. The pick-off signal of the pick-off of one input axis is applied, through the restraining electronics, to the torquer which acts about the other input axis and vice versa. In this way the rotational movements about two coordinate axes are detected by one gyro, such that the intertial sensor arrangement requires only two gyros in all.

The prior art inertial sensor arrangements present some problems:

In gyros of the present type an extremely large dynamic range has to be covered. This dynamic range may be larger than 1:50,000. Therefore correspondingly extremely high demands are made on the accuracy, linearity and constancy with temperature variations. This is also true for the temperature- and long-time stability of the restraining electronics.

Gyro errors—except for the temperature compensation—in practice cannot be compensated for in the restraining electronics. Such error correction has to be made in a digital computer to which the gyro signals are supplied. This is particularly true for gyro errors which depend on other influencing variables. Such influencing variables are e.g. linear accelerations. Gyros furthermore show the so called "cross coupling behaviour". In the case of dynamically tuned gyros, a rotational movement about the first input axis causes a torque about the second input axis. Hereby, because of the gyro mechanics (nutation) and the restraining loop structure, a reaction results which causes a torque about the first input axis and thus is interpreted falsely as a rotational movement about the second input axis.

Further problems arise with the digitizing of the analog output signal. When the digitizing is carried out by a convential comparative analog-to-digital converter, a quantization error results which corresponds to the value of the least significant digit of the digitized signal. In most applications the angular rate signal provided by the gyro is integrated to obtain an angular position signal. A quantization error of the angular rate signal means, that the angular rates are not detected at all up to the value of the least significant digit of the digitized signal. The integration of the angular rate signals with respect to time results in a systematical error which corresponds to a gyro drift. These systematical errors are generally a multiple of what is admissible.

Therefore it is known to use an integrating voltage-to-frequency converter for analog-to-digital conversion. The current applied to the torquer is converted to a frequency proportional thereto. Then each output signal of the voltage-to-frequency converter corresponds to an angular increment. This method makes high demands on the voltage-to-frequency converter because of the extended dynamic range. As a frequency has no sign, the sign of the output signal has to be generated independently. This causes matching problems in the range of low angular rates. As low angular rates are output at correspondingly low frequency, only a coarse quantization results when the inertial information is detected at a high clock rate of e.g. several 100 cycles per second.

Thereby the frequency transfer behaviour of the restraining electronics is affected adversely such that the impulses for generating the output information provided by the voltage-to-frequency converter first have to be added up. This causes an additional delay between the occurance of an angular rate and the output of the digital output information. Such a delay involves a lag which adversely affects closed-loop control.

DISCLOSURE OF INVENTION

It is the object of the invention to provide an inertial sensor arrangement of the type defined heretofore wherein an extended dynamic range can be obtained without excessive technical expenditure and/or gyro errors can be compensated in the inertial sensor arrangement itself and/or the output signal is digitized quickly and accurately without integrating quantization errors.

According to the invention this object is achieved in that (f) the pick-off signal is applied to an analog-to-digital converter for generating a digitized pick-off signal (g) the signal processing means comprise a digital computer which provides the output signal, (h) the digital output signal is applied to a digital-to-analog converter which provides an analog signal as restraining signal which is applied to the torquer.

Thus the restraining electronics operates digitally whereby the matching problems in the restraining electronics are avoided, which would occur in analog restraining electronics. Gyro errors can be memorized in the computer and can be taken into account. The digital computer forms part of the restraining loop. The digital output signal is directly provided by the computer. The analog restraining signal is generated from the digital output signal. No quantization error occurs.

Modifications of the invention are subject matter of the sub-claims.

BRIEF DESCRIPTION OF DRAWINGS

An embodiment of the invention will now be described in greater detail with reference to the accompanying drawings.

BEST MODE OF CARRYING OUT THE INVENTION

Figure 1:
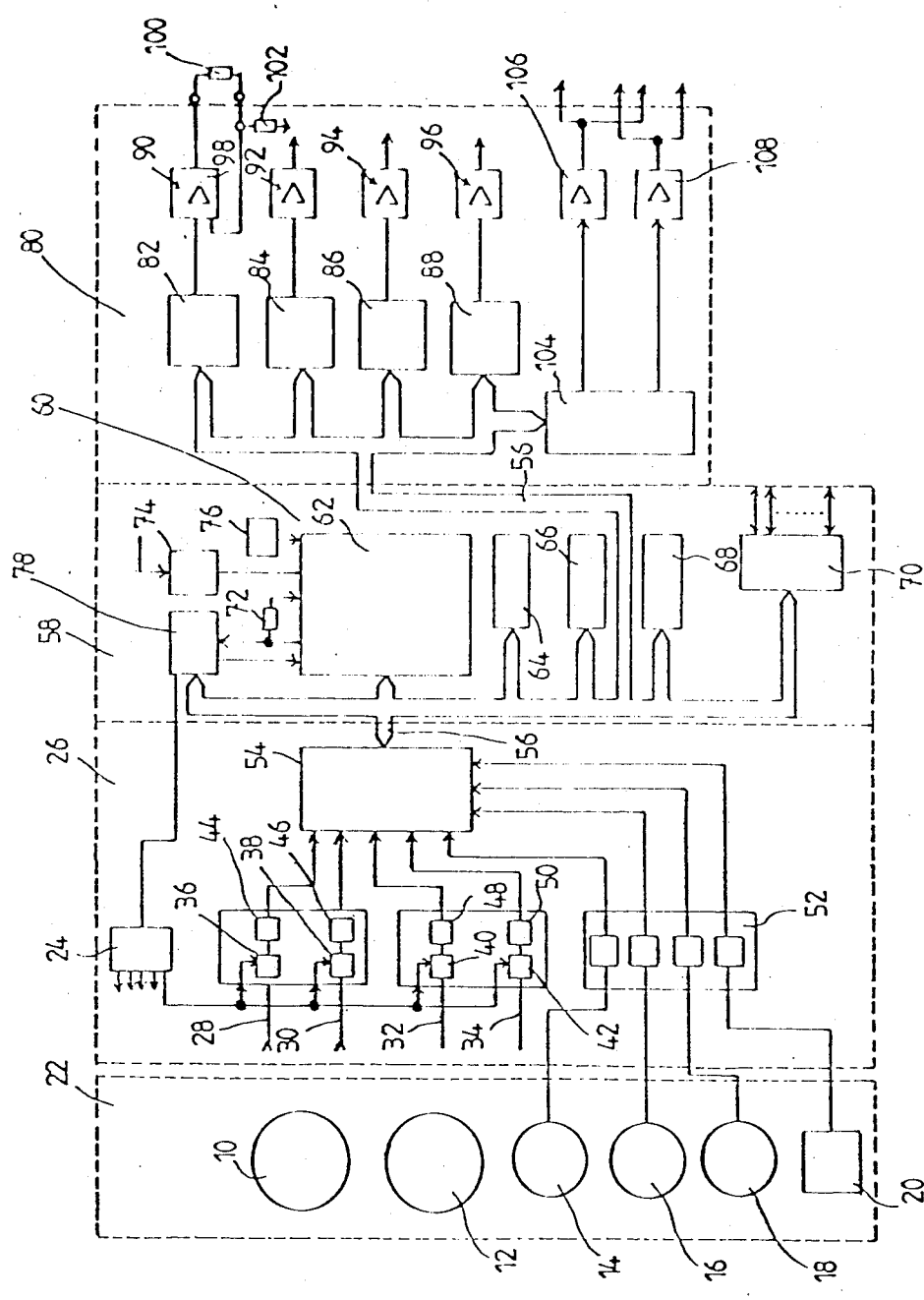
FIG. 1 is a block diagram of an inertial sensor arrangement.
Figure 2:
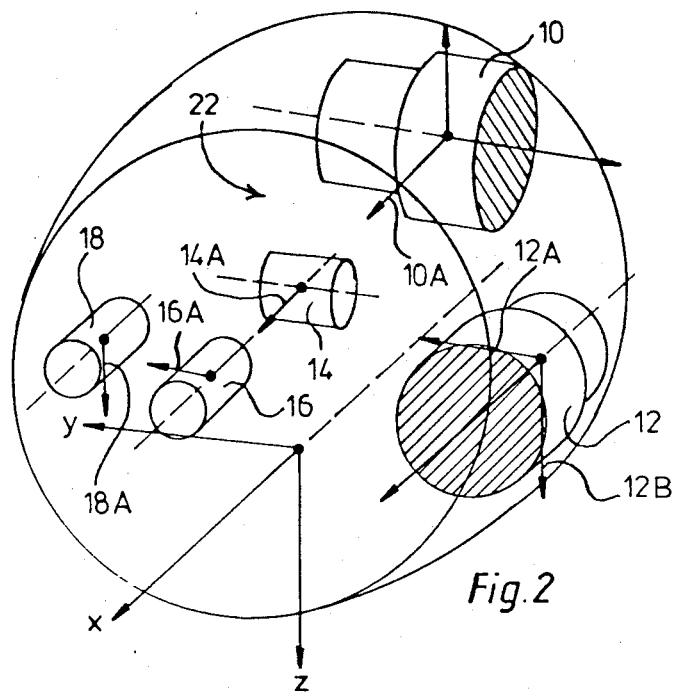
FIG. 2 illustrates schematically the arrangement in space of the inertial sensors in an inertial sensor arrangement of FIG. 1.
Figure 3:
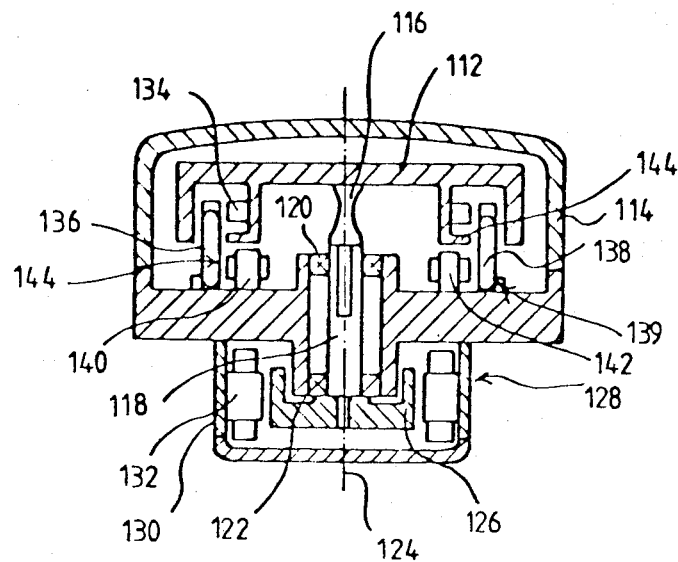
FIG. 3 illustrates schematically the design of a dynamically tuned gyro used in an inertial sensor arrangement of FIGS. 1 and 2.

In the embodiment of the invention the inertial sensor arrangement comprises a first gyro 10, of which the input axis 10A perpendicular to the spin axis coincides with the x-axis of a rectangular coordinate system x, y, z. The inertial sensor arrangement furthermore comprises a second gyro 12 which has two input axes. One input axis 12A is parallel to the y-axis of the coordinate system. the other input axis 12B is parallel to the z-axis of the coordinate system. Furthermore three accelerometers 14, 16, 18 are provided. The sensitive axes 14A, 16A, 18A of the accelerometers 14, 16, 18 are parallel to one of the coordinate axes each x and y and z, respectively, of said coordinate system. Eventually temperature sensors 20 are provided. The gyros 10, 12, the accelerometers 14, 16, 18 and the temperature sensors 20 are arranged in a sensor cluster 22. The gyros 10 and 12 are dynamically tuned gyros. Each gyro, for example 12, has a first input axis 12A (FIG. 2 and 4) perpendicular to its spin axis 12C, and a second input axis 12B perpendicular to the spin axis 12C and to the first input axis 12A. The construction of a dynamically tuned gyro is illustrated schematically in FIG. 3. FIG. 3 is a sectional view taken along a plane which is determined by the spin axis 12C and the input axis 12B in FIG. 4. A sectional view taken along a plane which is determined by the spin axis 12C and the input axis 12A in FIG. 4 would be identical with FIG. 3 and, therefore, is not illustrated separately.

A gyro rotor 112 is housed in a rotor housing 114. The gyro rotor 112 is connected with a shaft 118 through a spring joint assembly 116. The shaft is rotatably mounted in the rotor housing 114 about a motor axis 124 by means of bearings 120 and 122. A rotor 126 of a gyro motor 128 is coupled with the shaft 118. The gyro motor 128 is arranged in a motor housing 130. The motor housing 130 is attached to the rotor housing 114. The stator 132 of the gyro motor is supported in the motor housing 130. The gyro rotor 112 has a magnetic ring 134. Two torquer coils 136, 138 arranged in the plane of the input axis 12B and diametrically opposite with respect to the motor axis 124 act on the magnetic ring. These torquer coils 136, 138 form a torquer 139 for exerting a torque on the gyro rotor 112 about the input axis 12A normal to the plane of the paper in FIG. 3. Furthermore, diametrically opposite pick-off coils 140 and 142 are provided, which cooperate with a high permeability ring 144 on the gyro rotor 112. The pick-off coils 140 and 142 form a pick-off 144, which responds to deflections of the gyro rotor 112 about the input axis 12A normal to the plane of the paper in FIG. 3.

The spring joint assembly is preferably designed as shown in U.S. Pat. No. 4,592,242. The gyro is tuned such that the torques exerted on the gyro rotor 112 by the spring joints are just compensated by dynamic torques. Therefore the gyro rotor mechanically behaves like a free gyro.

Figure 4:
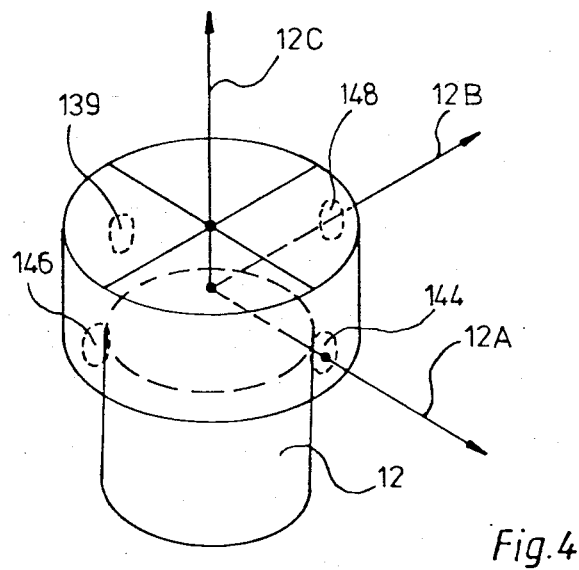
FIG. 4 is a schematic -perspective view and illustrates a gyro with its spin axis and its two input axes.

As has been illustrated schematically in FIG. 4, the torquer 139 and the pick-off 144 are located on the input axis 12A. A correspondingly designed torquer 146 and a correspondingly designed pick-off are located on the input axis 12B.

A first pick-off 144 in the form of a position pick-off supplied with an alternating current and a first torquer 139 are provided on the first input axis 12A. A second pick-off 148, also in the form of an inductive position pick-off supplied with an alternating current and a second torquer 146 are provided on the second input axis 12B. The pick-off signal from the first pick-off 144 generates a restraining signal through a restraining loop still to be described. This restraining signl is applied to the second torquer 146. The pick-off signal from the second pick-off 148, in turn, generates a restraining signal through the restraining loop. This restraining signal is applied to the first torquer 139. Rotational movement of the housing 114 about the first input axis 12A of the gyro 12, the spin axis 12C of which tries to maintain its orientation in space, results in a pick-off signal from the second pick-off 148. This pick-off signal causes the first torquer 139 to exert a torque on the gyro rotor 112 about the second input axis 12B. Hereby the gyro rotor precesses about the first input axis 12A, such that in practice the pick-off signal of the second pick-off 148 is kept zero. The torque and thus the first restraining signal supplied to the first torquer 139 are proportional to the angular rate about the first input axis 12A. The second pick-off 148 and the first torquer 139 cooperate correspondingly with angular rates about the second input axis 12B. In this way the gyro 10 or 12 is electrically restrained to its central position. The restraining signals are proportional to the angular rates about the first and second input axes, respectively. The pick-offs receive alternating currents from a pick-off power supply 24 which is arranged on a board 26 for signal processing. The pick-off signals of the gyros 10 and 12, which are alternating voltage signals with the frequency and phase of the alternating voltage of the pick-off power supply 24, are supplied to demodulators 36, 38, 40, 42 through inputs 28, 30, 32, 34. The demodulators 36, 38, 40, 42 are controlled by the alternating current, which is also supplied to the pick-offs of the gyros 10 and 12 as supply voltage from the pick-off power supply 24. Low-pass filters 44, 46, 48, 50 are connected to the outputs of the demodulators 36, 38, 40, 42, respectively. These low-pass filters 44, 46, 48, 50 smooth the phase-sensitively rectified alternating voltages. Thereby pick-off signals in the form of d.c. voltages are provided.

Numeral 52 designates signal processing means for the accelerometer signals from the accelerometers 14, 16, 18 and for the temperature signal from the temperature sensor 20. These signal processing means also provide output signals in the form of d.c. voltages.

The pick-off signals, the accelerometer signals and the temperature signal are applied to a multiplexer and a/d-converter 54 having 12 bit. This multiplexer and a/d-converter 54 is also mounted on board 26 as an integrated circuit. The multiplexer and the a/d-converter 54 consecutively transmits the pick-off signals, the accelerometer signals and the temperature signals to a data bus 56. The multiplexer and the a/d-converter 54 is a commercial, integrated element, which therefore is not described in further detail.

A computer is provided on a second board 58 and is generally designated by numeral 60. The computer 60 comprises a micro-processor 62, a direct access memory (RAM) 64, an EPROM 66 an electrically changeable memory (EEPROM) 68, which are all connected to the data bus 56. Furthermore a data bus interface 70 is connected to the data bus 56. This interface 70 is arranged to input and output signals. The data bus interface serves to communicate with other external systems.

Furthermore, a quartz 72 for the operation of the micro-processor 62, a circuit 74 for power-up initialization and a monitor circuit 76 for the operation of the micro-processor (watch dog) are provided on the board 58.

The computer is of conventional structure and therefore is not described in all details here.

A timer 78 is arranged on the board 58 and is connected to the data bus 56 and the micro-processor 62. The timer controls the pick-off power supply 24. A digital-to-analog converter 80 is connected to the data bus 56. The digital-to-analog converter 80 comprises four d/a converter elements 82, 84, 86, 88 which are connected to the data bus 56. The d/a converter elements provide analog signals according to the digital output signals provided by the computer and representing the angular rate. Furthermore the digital-to-analog converter 80 comprises four precision current sources 90, 92, 94, 96 which convert the analog signals of the d/a-converter elements 82, 84, 86, 88 to output currents proportioal thereto. These currents flow through the respective coils of the torquers. Each torquer generates a torque proportional to the output current flowing therethrough.

A precision current source 90 is illustrated in further detail with reference to the d/a-converter element 82. The precision current source 90 comprises a differential amplifier 98. The coil 100 of the torquer is connected in series with the measuring resistor 102 to the output of the differential amplifier 98. The voltages of the digital-to-analog converter element 82 and—as feedback—the voltage dropping across the measuring resistor 102 are opposed at the input of the high gain amplifier 90.

Furthermore a timer 104 with an additional logic is provided. The timer 104 is connected to the data bus 56 and responds directly to the micro processor 62. The timer 104 controls the phases of the gyro motors for the gyros 10 and 12 through power amplifiers 106 and 108.

The digital-to-analog converter 80, the timer 104 and the power amplifiers 106 and 108 are arranged on a board 110.

The boards 26, 58 and 110 are combined with the sensor cluster 22 to a modular unit.

Figure 5:
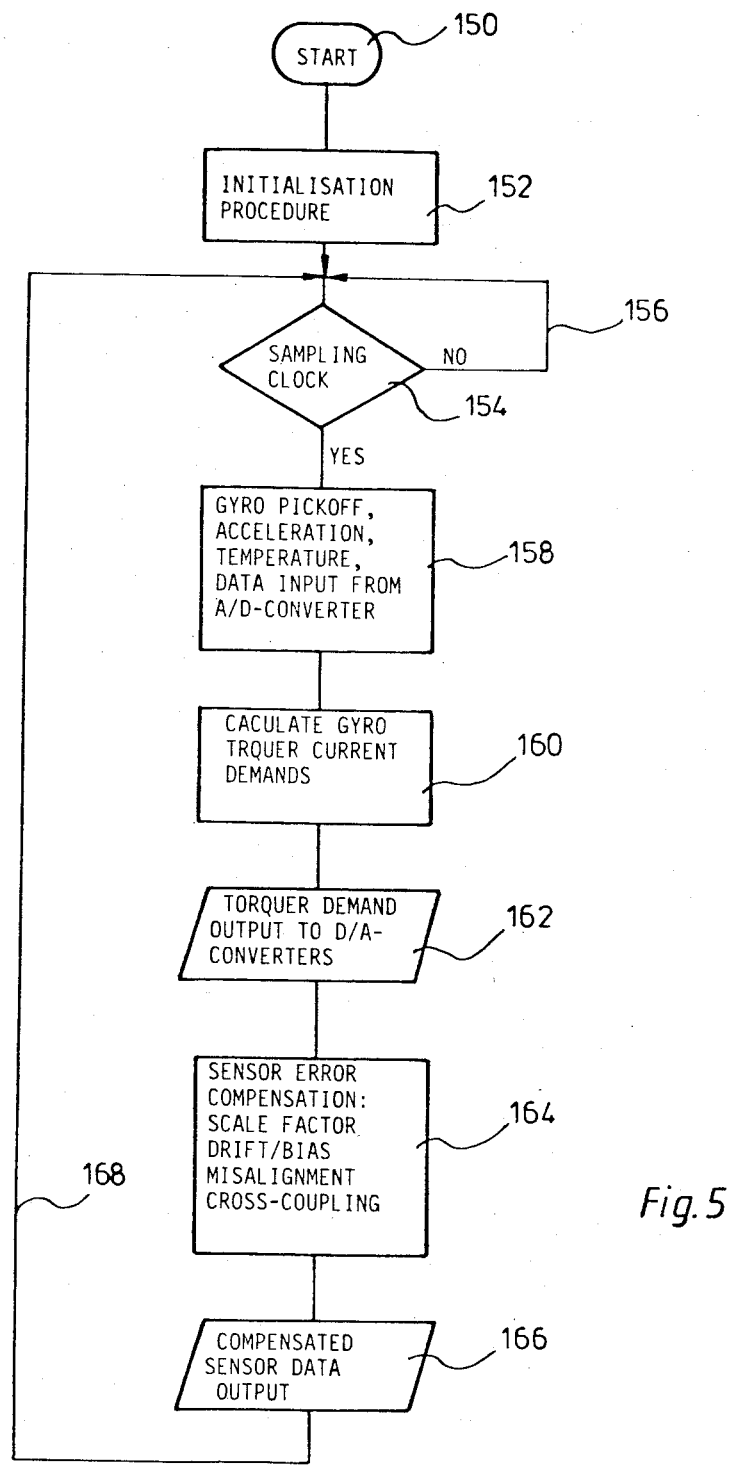
FIG. 5 is a flow chart of the signal processing in a computer in the inertial sensor arrangement of FIG. 1.
Figure 7:
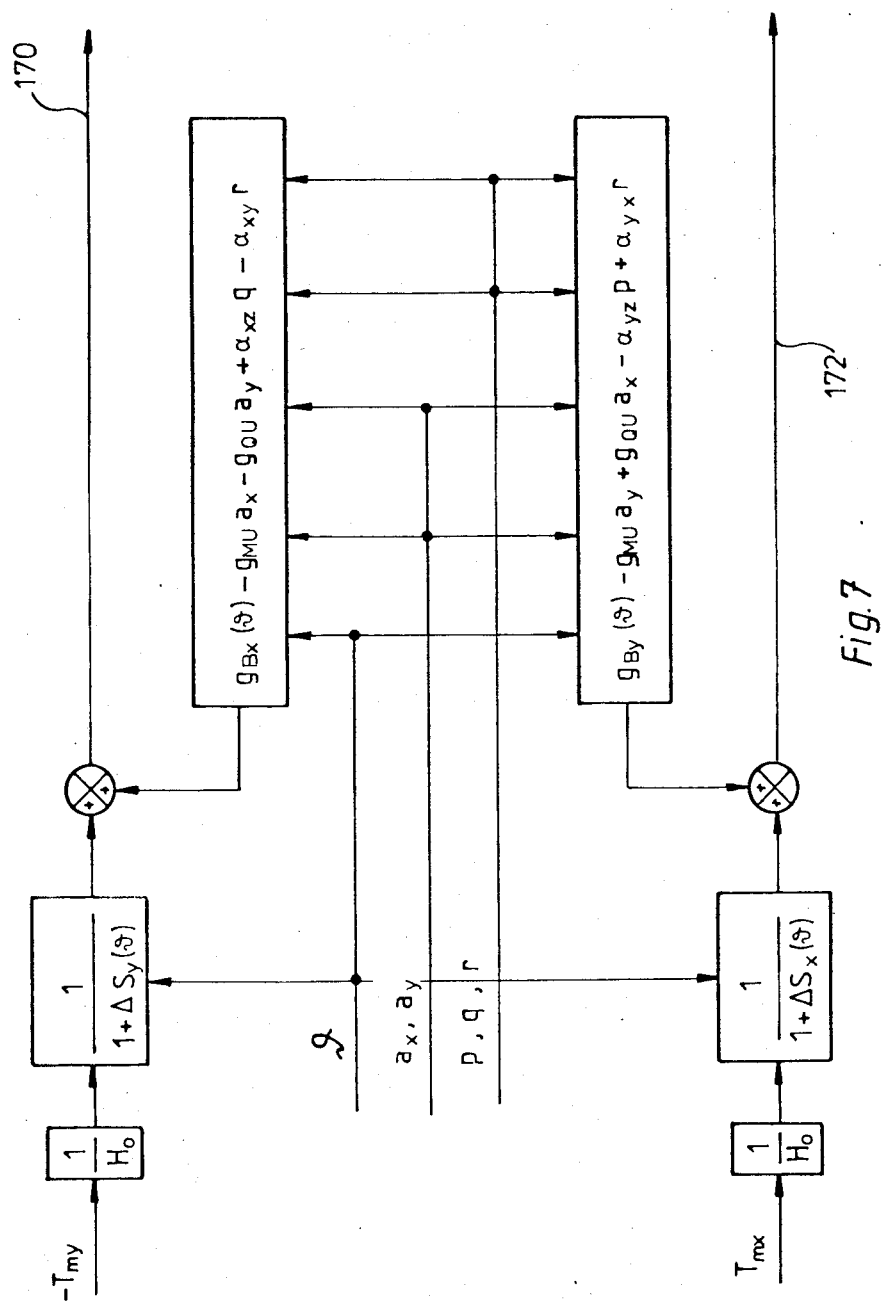
FIG. 7 is a block diagram of the digital signal processing for correcting the digital restraining signals to provide angular rate signals.

FIG. 5 is a flow chart and illustrates the signal processing in the computer.

The start of the program is symbolized by an oval 150. The start of the program is followed by a conventional initialization, which is symbolized by a rectangle 152. Sampling and processing of the data is effected with a predetermined clock sequence. The clock period is slightly longer than the time required for the signal processing. Care has to be taken that the data are sampled at well defined moments. Therefore the program contains an inquiry, whether or not the clock signal is applied. This inquiry is symbolized by a diamond 154. If the clock signal is not yet applied (NO), the program will run through a loop 156. If the clock signal is applied (YES), the program will continue to run.

The data from the gyro pick-offs, the accelerometers 14, 16, 18 and the temperature sensor 20 are sampled and are input into the computer 60 through the multiplexer and A/D converter 54. This is illustrated by rectangle 158. From these data the computer 60 computes the currents to be supplied to the torquers of the gyros 10 and 12. These currents, at first, are given as digital signals. This is illustrated by rectangle 162.

The values so obtained in digital form of the currents to be supplied to the gyros 10 and 12 are converted to corresponding currents by means of the D/A converter components and are supplied directly to the associated torquers. This causes the gyro to be electrically restrained to its position of rest. This is achieved with minimum delay. Therefore the gyros are safely restrained to their position of rest, even if the values of the currents are not ideally indicative of the angular rates occurring but are subjected to certain errors. This conversion is illustrated in the flow chart by a rhomb 162.

Furthermore the digitally obtained values of the currents to be supplied to the torquers are subjected to a sensor error compensation. Sensor errors such as scale factor errors, drift or zero error, misalignment and cross coupling are compensated for. This is illustrated by rectangle 164. The compensated data thus obtained are output. This is illustrated by the rhomb 166.

Subsequently the program reverts through the inquiry according to diamond 154 through loop 168. Upon the next clock signal, there will be another sampling of data. The signal processing described is repeated.

Figure 6:
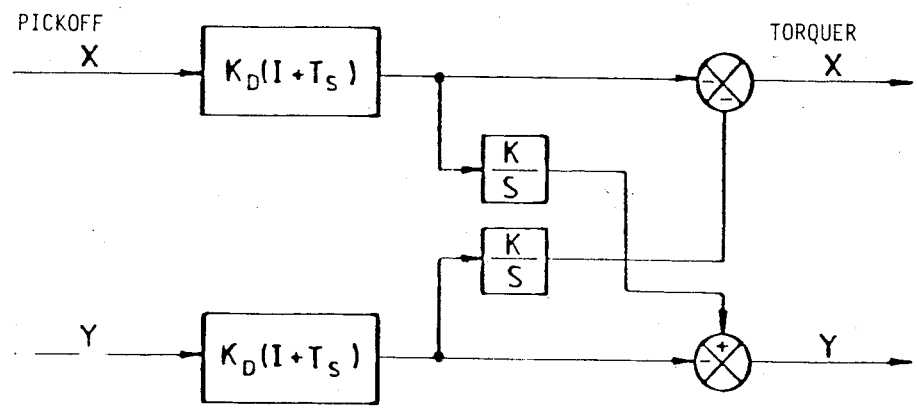
FIG. 6 is a block diagram of the digital signal processing for providing digital restraining signals which are converted to currents by means of a D/A converter, the currents being supplied to torquers of the respective gyro.

FIG. 6 is a block diagram and illustrates, for one of the gyros, the digital signal processing of the signals provided by the pick-offs 144, 148 for the generation of digital output signals representing the value of the currents through the torquers.

The signals provided by the pick-offs 144, 148 and digitized are transferred by the computer 60 with a transfer function of $K_D(1+Ts)$. Therein s is the variable of the Laplace transform, T is a time constant, and
K_D is a transfer factor.

Each of the signals thus transferred from pick-off 144 or pick-off 148 is, on one hand, applied, as a first term, to the digital output which provides the digital output signal corresponding to the demanded current for the torquer, the sign of the signal being reversed. The first term from the respective other pick-off is superposed to this first term with a transfer function $K_I/s$ as a second term with positive or negative sign, respectively.

In this way, digital output signals $-T_{my}$ and $T_{mx}$ are obtained, which are converted to analog currents for the torquers by means of the D/A converter components.

The digital signals $-T_{my}$ and $T_{mx}$ are divided by the gyro spin $H_o$. The correction for the scale factor error is effected by furthermore dividing the signals by $1+S_y(\theta)$ and $1+S_x(\theta)$. Therein $S_y$ is the scale factor error for the relation between the signal which determines the current through the torquer acting about the y-axis, and the actual angular rate about the x-axis, $S_x$ is the scale factor error for the relation between the signal which determines the current through the torquer acting about the x-axis, and the actual angular rate about the y-axis, and $\theta$ is temperature.

Corrective signals, which have the dimensions of gyro drifts, are superposed to the signals thus corrected, the corrective signals having the form of:

$$g_{Bx}(\theta) - g_{MU}a_x - g_{QU}a_x + a_{xz}q - a_{xy}r$$

$$g_{By}(\theta) - g_{MU}a_x + g_{QU}a_x - a_{yz}p + a_{yx}r.$$

Therein $g_{Bx}(\theta)$ and $g_{By}(\theta)$ are temperature-dependent gyro drifts, $\theta$ is temperature $g_{MU}$ is a mass unbalance factor, $a_x$ and $a_y$ are accelerations along the x-axis and the y-axis, respectively, $g_{QU}$ is a cross-coupling (quadrature) factor, $a_{xz}, a_{xy}, a_{yz}, a_{yx}$ are misalignment angles.

Temperature is provided by temperature sensor 20. The acceleratios $a_x$ and $a_y$ are provided by the accelerometers 14 and 16, respectively. The angular rates p,q and r are measured by the gyros 10 and 12. Corrected angular rate signals are then available at the outputs 170 and 172 in digital form for further processing.

The described inertial sensor arrangement operates as follows:

The pick-off signals from the gyros 10 and 12 are demodulated by the demodulators 36, 38, 40, 42. The demodulated signals are smoothed by the low-pass filters and supplied to the computer 60 as digital signals through the multiplexer and analog-to-digital converter. Equally the computer 60 receives the acceleration signals from the accelerometers 14, 16, 18 as well as the temperature signal from the temperature sensor 20 through the multiplexer and analog-to-digital converter 54.

The computer 60 generates digital output signals from the pick-off signals. These digital output signals, similarly to the analog networks of the prior art, show a time response chosen according to aspects of automatic control and are converted to analog restraining signals by the digital-to-analog converter 80. In addition the computer 60 is programmed such that the influences of the "cross coupling behaviour" already described above, i.e. the influencing of the angular rate measurement about one input axis by rotational movements about the other input axis, are compensated for. The computer 60 also compensates for influences of linear acceleration on the measurement of the angular rate of the gyros 10 and 12. Eventually the computer 60 compensates also for temperature variations.

Gyro parameters such as pick-off zero errors, scale factors, dependence of the scale factor, alignment errors in assembling of the gyros, dependence on accelerations etc. are measured in the assembled unit and memorized in the electrically changeable memory 68. These parameters are then taken into account during the signal processing in the program of the computer 60. Thus it is not necessary to measure each individual inertial sensor, but the gyro parameters are measured in the complete, assembled inertial sensor arrangement and memorized in a memory 68. These gyro parameters are not taken into account in an external computer, to which digitized angular rate signals derived from the torquer currents are supplied as in the prior art. Thus the inertial sensor arrangement rather provides already corrected angular rate signals, which are obtained by correction of the digital signals determining the torquer curents.

The inertial sensor arrangement described offers essential advantages as compared to the prior art inertial sensor arrangement with analog restraining loop:

By using digital control, influence of temperature and ageing on the automatic control are avoided. Thereby complex filters, transfer functions etc. do not depend on component tolerances and environmental influences. The digital processing ensures high resolution.

Only minimal time delays occur by the digitizing of a restraining signal.

No integrating quantization error occurs. This is to be explained by an example: The quantization of the precision current source 90 is assumed to correspond to an angular rate of 30°/h for example. The effective component of the angular rate of the rotation of the earth is about 12°/h in medium latitudes. When the rotation of the earth acts on the gyro, the amount of the restoring torque required for the compensation of the rotation of the earth is smaller than that which can be provided by the precision current source 90. In the prior art with analog restraining loop the gyro is restored by a correspondingly small restraining signal. This small restraining signal, however, is not taken into account in the analog-to-digital conversion. This results in an integrating error. In the described arrangement, at first the output signal is zero, and accordingly no analog restraining signal becomes effective. Hence no restoring torque acts on the gyro. The gyro rotor is rotated relatively to the housing by a small amount. During the next scanning interval, it is tested again, whether the pick-off signal has already reached a value which is equal to the quantization of the precision current source, i.e. the unit of the least significant digit of the output signal of the a/d-converter component 82. This will be true after several scanning cycles. Then a "one" appears in this least significant digit of the output signal. The precision current source 90 provides a corresponding analog restraining signal, which now restores the gyro rotor through a corresponding angular amount. This procedure is repeated as often as desired. Angular rates which are smaller than the resolution of the a/d-converter element 82 are therefore taken into account in the temporal change of the digital output signal. Thus the integration of a quantization error is prevented. These considerations are true in the same way for any intermediate values of the angular rate which cannot be represented by the digital output signal of limited resolution.

Also errors of the precision current source in the form of zero errors, scale factor errors and dependence on temperature can be taken into account in the model which is the basis of the error compensation in the computer.

In the described inertial sensor arrangement only conventional accuracies and qualities are demanded from the signal processing modular units and converters and no trimming of these modular units and converters is necessary. Therefore the costs of production of these modular units are relatively low. The interchangeability of these units allows efficient production of the total system.

We claim:

1. Inertial sensor arrangement, comprising
   (a) at least one gyro with a spin axis,
   (b) a pick-off provided on the gyro and responding to rotational movement about an input axis perpendicular to the spin axis of the gyro and generating a pick-off signal,
   (c) a torquer arranged on the gyro to exert a torque on the gyro about an axis perpendicular to the spin axis and to the input axis,
   (d) signal processing means, to which the pick-up signal is supplied, said signal processing means being arranged to generate a restraining signal applied to the torquer,
   (e) means for generating a digital output signal indicative of the restraining signal, wherein
   (f) the pick-off signal is applied to an analog-to-digital converter for generating a digitized pick-off signal
   (g) the signal processing means comprise a digital computer which provides said output signal as a digital signal for further processing indicative of angular rate about said input axis, and
   (h) the ditigal output signal is applied to a digital-to-analog converter which provides an analog signal as restraining signal which is applied to the torquer.

2. Inertial sensor arrangement as set forth in claim 1, wherein
   (a) said gyro forms part of a gyro arrangement with three pick-offs, the pick-offs responding to rotational movements about three mutually orthogonal axes and providing three pick-off signals, and
   (b) the pick-off signals are consecutively digitized by a multiplexer and are applied to the computer.

3. Inertial sensor arrangement as set forth in claim 2, including accelerometer means which respond to accelerations in the direction of three mutually orthogonal sensitive axes.

4. Inertial sensor arrangement as set forth in claim 2, wherein the computer is programmed to compensate, according to a gyro error model, the influence of a rotational acceleration about an axis on the measurement of the rotational movement.

5. Inertial sensor arrangement as set forth in claim 3, wherein the computer is programmed to compensate the influence of the linear acceleration on the measurement of the angular rate in accordance with a gyro error model.

6. Inertial sensor arrangement as set forth in claim 1, characterized in that the computer comprises a gyro parameter memory arranged to memorize fixed gyro parameters which are determined by a test of the whole inertial sensor arrangement, these gyro parameters being taken into account in the computer, when the output signal is formed.

7. Inertial sensor arrangement as set forth in claim 1, wherein
   (a) at least one temperature sensor is provided
   (b) the signals from the temperature sensor are digitized and applied to the computer and
   (c) the computer is arranged to compensate the temperature influence on the measurement of the angular rate in accordance with a gyro error model.

8. Inertial sensor arrangement as set forth in claim 1, wherein the computer is combined with the inertial sensors to form a modular unit.

9. Inertial sensor arrangement as set forth in claim 1, wherein the angular-to-digital converter comprises a precision current source which provides a current for the torquer.

10. Inertial sensor arrangement as set forth in claim 1, wherein the gyro is a dynamically tuned gyro.

* * * * *